No. 843,202. PATENTED FEB. 5, 1907.
H. M. FRANK.
SPLIT PULLEY.
APPLICATION FILED JUNE 30, 1906.
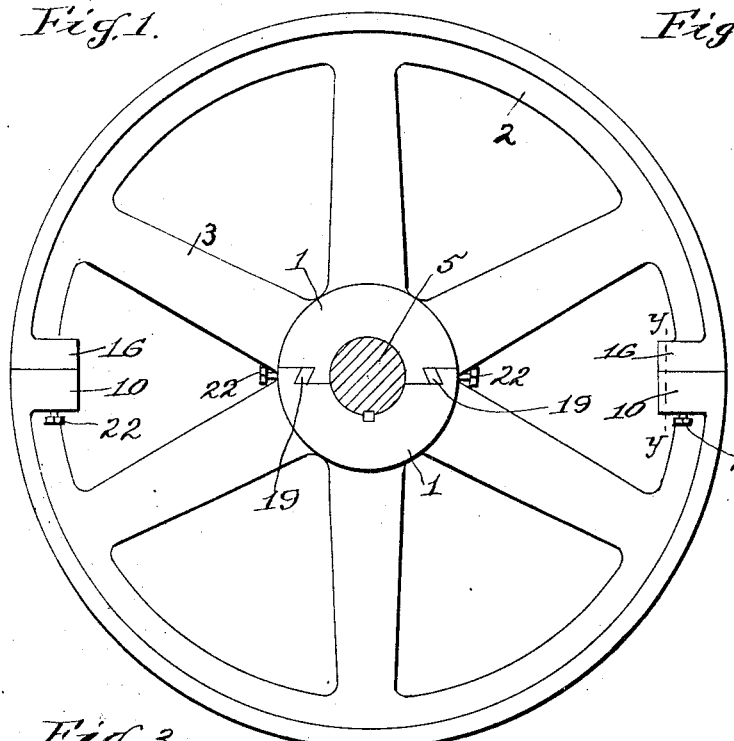
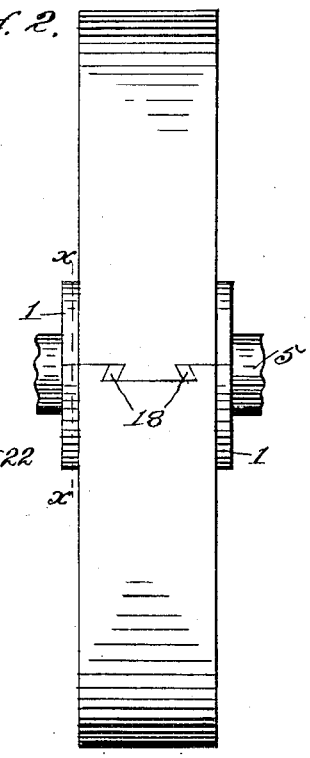
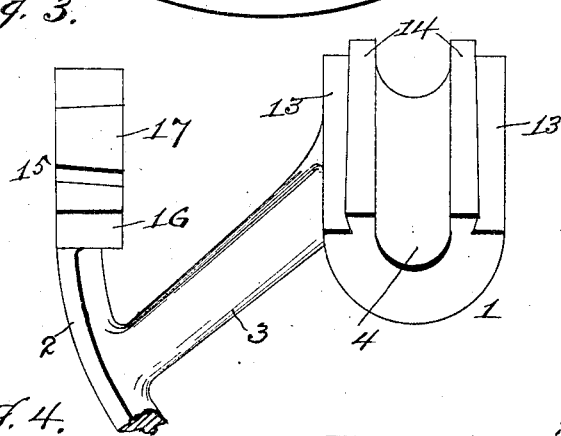
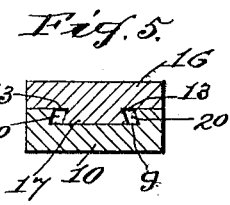
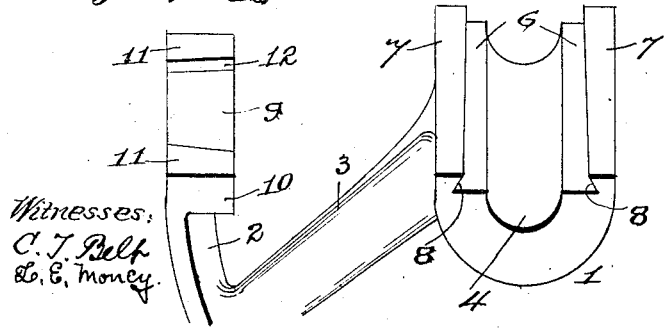
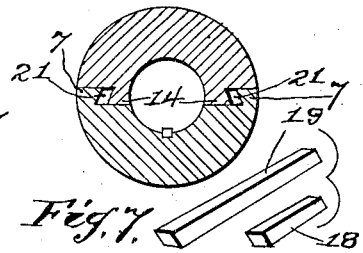
Witnesses:
C. J. Belt
L. E. Money
Inventor
Henry M. Frank
By W. H. Wells
Attorney

UNITED STATES PATENT OFFICE.

HENRY M. FRANK, OF EL PASO, TEXAS.

SPLIT PULLEY.

No. 843,202.   Specification of Letters Patent.   Patented Feb. 5, 1907.

Application filed June 30, 1906. Serial No. 324,122.

*To all whom it may concern:*

Be it known that I, HENRY M. FRANK, a citizen of the United States, residing at El Paso, in the county of El Paso and State of Texas, have invented certain new and useful Improvements in Split Pulleys, of which the following is a specification.

This invention relates to pulleys, and pertains especially to split pulleys of the class having interlocking parts. The parts or halves of said class of pulleys invariably have to be slid longitudinally to effect the locking and unlocking of the parts in applying the pulleys to a shaft and in removing it therefrom.

The main purpose, therefore, of this invention is to furnish a pulley of such construction and arrangement that the parts thereof may be clamped or locked together without sliding them longitudinally.

The object of the invention is to furnish a split spider or open-web pulley of metal having the joining faces of its rim and hub provided with beveled walls, forming key-openings.

The object, further, of the invention is to provide in a split pulley a hub the coacting faces of which form a longitudinal key-seat upon opposite sides of the shaft opening or bearing and a split-pulley rim the coacting faces of which form key-seats perpendicular to the key-seats of the hub.

The object, still further, of the invention is to provide in a split pulley a hub and a rim having diamond-shaped tapering key-seats formed by the coacting faces of the hub and rim and to furnish diamond-shaped tapering keys to lock and bind the rim-faces and the hub-faces respectively together.

In the accompanying drawings, forming part of this application, Figure 1 is a side elevation of a pulley embodying my invention, Fig. 2 is a peripheral elevation of the pulley. Fig. 3 is a perspective view of the male member of the pulley, partly broken away. Fig. 4 is a similar view of the female member of the pulley, partly broken away. Fig. 5 is a section on the line $y\ y$, Fig. 1, with the keys removed. Fig. 6 is a section on the line $x\ x$, Fig. 2, with the keys removed. Fig. 7 is a perspective view of the keys.

The same reference-numerals denote the same parts throughout the several views of the drawings.

The invention is applicable to split pulleys of various character and design; but the spider type of pulley herein shown is preferable. It has a halved hub 1, connected to a rim 2 by arms or spokes 3, and an opening or bearing 4 for a shaft 5.

For the purpose of differentiating the halves of the pulley they will be hereinafter termed "male" and "female" parts. The hub-face 6 of the female part has a pair of longitudinal flanges 7 flush with the periphery of the hub. The flanges taper in opposite directions from one side of the hub to the other, and the tapering face 8 of each flange is beveled inwardly throughout its length.

The female rim-face 9 is formed by a rim-lug 10, having a pair of flanges 11, the inner faces 12 of which are beveled inwardly and taper one in the opposite direction to the other. The hub-face 13 of the male part has a pair of cleats 14, one side of which is flush with the shaft-bearing and the other side of which is beveled, and said beveled sides taper in opposite directions. The male rim-face 15 is formed by a lug 16 and has a central cleat 17, the sides of which are beveled and taper in opposite direction. The rim-keys 18 and the hub-keys 19 are each tapered and diamond-shaped in cross-section to fit the diamond-shaped openings 20 and 21, respectively, formed by the coacting faces of the hub and rim parts, and said keys are held in place by set-screws 22.

It is obvious that in applying the pulley to a shaft the pulley parts are simply placed face to face on the shaft and the keys inserted, which draws and clamps the parts tightly together. In adjusting the pulley to various positions on the shaft the keys have only to be partly withdrawn to loosen the parts sufficiently to move the pulley without separation.

Having thus described my invention, what I claim as new, and desire to secure by Letters Patent, is—

1. A split pulley having longitudinal hub-flanges and cleats, rim-flanges and cleats perpendicular to the hub-flanges and cleats, and keys interposed between each set of said flanges and cleats to lock the pulley parts together.

2. A split pulley having longitudinal tapering flanges and cleats in its hub, tapering flanges and cleats in its rim perpendicular to the hub-flanges and cleats, and keys interposed between each set of said flanges and cleats to clamp the pulley parts together.

3. A split pulley comprising male and female pulley parts having coacting faces adapted to fit one against the other without sliding them and to leave key-seats therebetween, and two sets of clamping-keys one set of which fit certain of the seats perpendicular to the other set.

4. A split pulley comprising tapered hub-flanges and cleats parallel with the hub-bearing and having beveled sides, the tapered rim-flanges and cleats perpendicular to the hub-flanges and cleats and having beveled sides, and the diamond-shaped tapering keys adapted to fit between the various flanges and cleats for securing the halves of the pulley together.

In witness whereof I hereunto set my hand in the presence of two witnesses

HENRY M. FRANK.

Witnesses:
J. T. MURRAY,
H. P. NOAKE.